Figure 1:
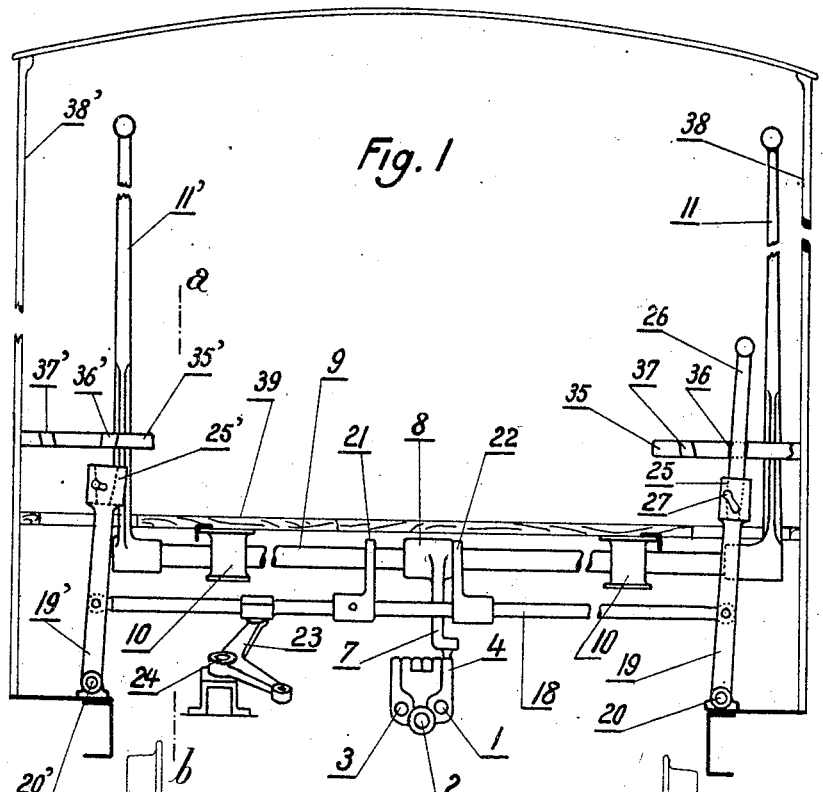

June 30, 1925.

P. E. M. DONON 1,543,754

DEVICE FOR THE CONTINUOUS AND PROGRESSIVE CONTROL OF A SERIES OF SPEEDS

Filed Feb. 13, 1924   2 Sheets-Sheet 1

Inventor
P.E.M. Donon
by Langner, Parry,
Card + Langner
Attys.

Patented June 30, 1925.

1,543,754

UNITED STATES PATENT OFFICE.

PIERRE EUGÈNE MARIE DONON, OF PARIS, FRANCE.

DEVICE FOR THE CONTINUOUS AND PROGRESSIVE CONTROL OF A SERIES OF SPEEDS.

Application filed February 13, 1924. Serial No. 692,592.

*To all whom it may concern:*

Be it known that I, PIERRE EUGÈNE MARIE DONON, a citizen of the French Republic, residing at 3 Rue du Commandant Marchand, Paris, XVIe, France, have invented certain new and useful Improvements in Devices for the Continuous and Progressive Control of a Series of Speeds, of which the following is a specification.

My invention has for its object an arrangement enabling the control of a series of speeds obtained by the combination of two change speed boxes, by means of levers which are constantly moved in the same direction, the transfer from one operating rate to another being effected by moving the levers laterally by means of auxiliary levers which at the same time control the change of the operating rate provided by the second change speed box.

The said arrangement is chiefly applicable to a change speed device comprising a box for six speeds and a second box for two speeds, this device being especially adapted for use upon the traction vehicles which are employed for handling trains of wagons in railway stations or upon extensive construction grounds. The slow speed is used during the actual handling of the trains, whilst the high speed is employed when the vehicle is to travel from one place of work to another, either without load or with a light train.

But it is necessary that the control of a traction vehicle of this class should be carried out by a single person, who is occupied with the levers and other control parts, but is further required to observe the signals which are made to him upon the track, and at either side of the vehicle. So that if the arrangement comprised but a single lever for changing the speed and a single lever for changing the operating conditions, it would be necessary to place both these levers at the middle of the cabin, and hence the driver must change his position when after observing a signal from his usual station on the left he is obliged to proceed to the middle in order to control the vehicle by means of the levers. For this reason, each change of speed would cause a loss of time which is prejudicial to the continuous operation of the vehicle.

In my said invention, each of the two control levers, i. e. the change speed lever and the auxiliary lever for changing the operating conditions, as employed in the above-mentioned arrangement, is duplicated, and a pair of levers is placed at either side of the vehicle. The two change speed levers are keyed respectively to the ends of a horizontal transverse shaft and are thus in integral disposition; in like manner the two auxiliary levers are mounted respectively at the ends of a horizontal transverse rod and are also in integral disposition. In this manner, the control can be entirely carried out from either side of the vehicle at will, or it can be commenced at one side and continued on the other should circumstances so require.

In practice, all the other control devices, e. g. for increasing the engine speed, unclutching, braking and the like, are also duplicated.

A constructional form of the said control device, corresponding to the case in which the first speed box provides for six speeds and the second for two speeds, is shown by way of example in the appended drawings.

Figure 4:
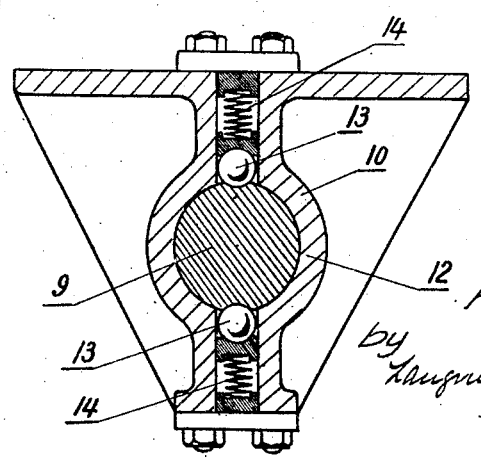
Figure 2:
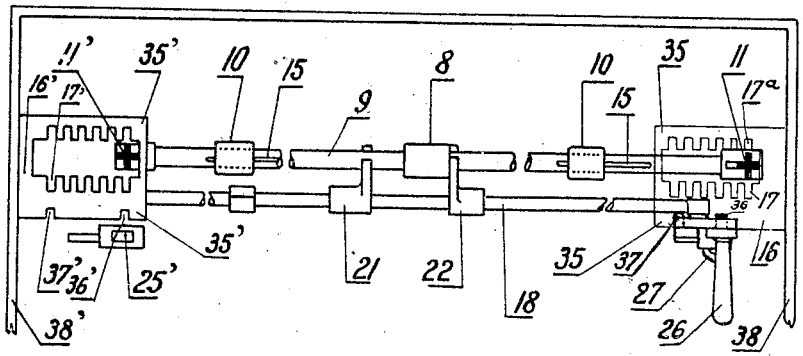
Figure 3:
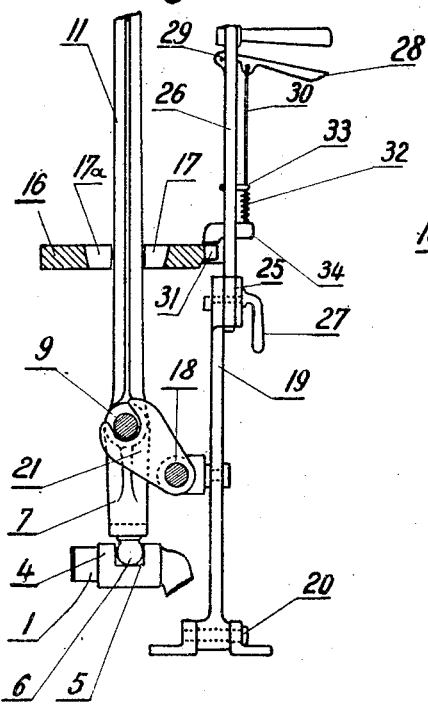
Figure 5:
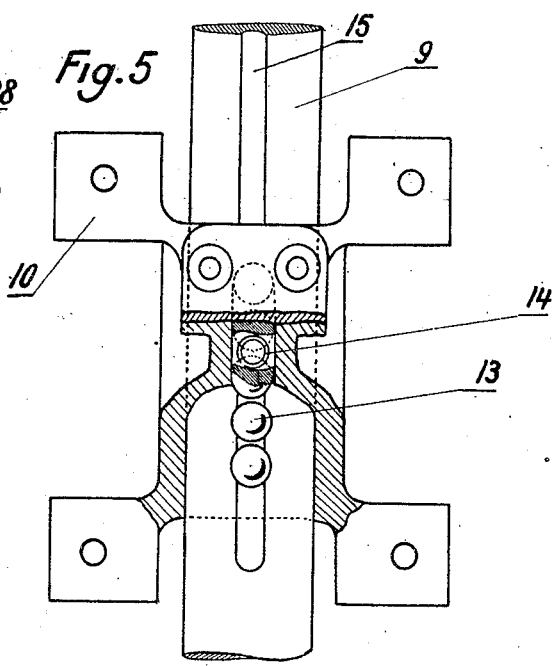

Fig. 1 is an end elevation of the said vehicle, and Fig. 2 is a corresponding plan view. Fig. 3 is a section on the line *a—b* of Fig. 1. Figs. 4 and 5 are respectively a vertical section and a plan view of one of the bearings for the control shaft of the change speed device.

Each of the rods 1, 2, 3 provided with forks controlling the sliding gears for the first change speed box, has at its end a double head, each of the two parts of each head (e. g. 4, Fig. 3) is provided with a notch 5 co-operating with the end 6 of a rod 7 ending in a sleeve 8 which is keyed to the horizontal shaft 9, Fig. 1. The said shaft is revoluble on its axis and is also slidable lengthwise in the bearings 10; it is provided at each end with a control lever 11, 11′ which is keyed to the shaft.

The bearings 10, Figs. 4 and 5, comprise a cylindrical portion or collar 12 in which is disposed the shaft 9. At the top and bottom of the said collar are disposed a certain number of balls 13 extending outwardly of the said collar, the balls being urged towards the centre by the springs 14. The shaft 9 has at the top and bottom a groove 15 co-operating with the portion of the said balls extending into the interior of said collar when the shaft is in the "stop" position or is to slide lengthwise. In this manner the shaft is enabled to slide with great facility. When the shaft 9 is to rotate on its axis in the bearings 10, the grooves 15 are readily disengaged from the said balls by reason of the spring mounting of the latter.

Each of the levers 11, 11' moves in a horizontal control plate 16, 16', Figs. 2 and 3, having twelve notches which are oppositely situated in pairs, e. g. 17, 17', and corresponding to twelve speeds. The two levers co-operate with the said notches, being displaced together with the shaft 9, i. e. in the rotation of the shaft or in its lengthwise sliding motion.

Parallel to the shaft 9 is disposed a rod 18 having pivoted to each end a lever 19, 19' moving on the respective axles 20, 20'. To the said rod are keyed two members 21, 22 terminating in a fork surrounding the shaft 9, the said members forming tappets upon the shaft 9 for the sleeve 8. To the rod is pivoted the end of a bell-crank 23 pivoted to an axle 24 and controlling by means of a rod, not shown, the displacement of the fork serving to change the gear ratio in the second change-speed box.

Each lever 19, 19' has at the upper end a conical recess 25, 25' co-operating with the end of a removable arm 26 which can be secured to either lever for instance by a key 27. The arm 26 is completed by fastening means comprising a handle 28 pivoted at 29, to which is attached a rod 30 having at the lower end a downwardly extending projection 31. A spring 32 which abuts respectively upon a stop-piece 33 secured to the arm 26 and member 34 mounted on the lower end of the rod 30, urges the said rod in the downward direction.

The arm 26 is respectively displaced, according as it is disposed upon the lever 19 or 19', before the plates 35, 35' (which may be cast together with the control plates 16, 16', Fig. 2) each of which is provided with the notches 36, 37 or 36', 37' corresponding to the two gear ratios in the second change speed box. The said notches co-operate with the projection 31, thus locking the levers 19, 19' in either position.

The control plates 16—35, 16'—35' are disposed upon the lateral walls 38, 38' of the cabin of the traction vehicle. The mechanical parts for the speed changing and change of operation, as well as the shafts 9 and 18 are disposed below the flooring 39 which is traversed by the levers 11, 11', 19, 19'.

The operation is as follows:

The removable arm is placed upon the lever (19, 19') situated upon the control side of the vehicle, and is secured by the key 27. In the position shown in Figs. 1, 2 and 3, the shaft 9 is at the end of its right hand stroke and the levers 11, 11' are each disposed in their respective control plates between the notches 17 and 17ª corresponding to the first and the second speed. If the device is to be engaged for either of these speeds, it suffices to swing the combination of the levers 11 and 11', and the shaft 9, on the axis of the shaft 9, Fig. 3.

If on the contrary it is desired to increase the speed, the combination 9—11—11' is caused to slide to the left until the levers 11, 11' move in the control plate opposite the notch corresponding to the desired speed, and then to pivot the said combination on the axis of the shaft 9. Upon reaching the fifth and the sixth speeds, the sleeve 8 secured to the shaft 9 comes into contact with the tappet 21 mounted on the rod 18 which has hitherto remained stationary. So that if it is desired to proceed further in the range of speeds and to change the operating conditions of the second box, one presses upon the handle 28 of the latch of the movable arm 28, raising the same and compressing the spring 32, and releasing the projection 31 from the notch 36, then the lever 19 is pivoted on the axle 20 so as to impel to the left—i. e. in the same direction as the combination of the levers 11, 11'—the rod 18 and the tappets 21, 22, and the lever 19 is locked in the position corresponding to the higher operating rate by allowing the projection 31 to enter the notch 37. In this manner, one may continue to drive the combination of the levers 11, 11' progressively to the left, so as to obtain the different speeds, from the seventh to the twelfth.

Upon descending the scale of speeds, and when the levers 11 and 11' attain a position corresponding to the seventh and the eighth speeds, the sleeve 8 comes into contact with the tappet 22, and the operation can only be continued by swinging the lever 19 towards the right. It therefore becomes necessary to use but a single removable arm 26 which can be placed upon the lever (19 or 19') situated upon the control side of the vehicle, so that none of the locking parts can act upon the other end of the rod 18. On the other hand, the fact of changing the said arm from one side of the vehicle to the other when the control is to be changed over, will occasion no inconvenience, since the rate of operation is changed only when the vehicle is to proceed from one point of utilization to another, or when the vehicle is to cover a considerable distance between stations. In both these cases, the driver no longer receives orders from a controlling chief on the ground, and may occupy the lateral position in the cabin as he sees fit.

What I claim is:

1. A device for the continuous and progressive control of a series of speeds obtained by the combination of two change speed boxes, comprising a rotatable and longitudinally slidable horizontal control shaft, a control lever mounted upon each end of said shaft, two auxiliary levers positioned adjacent the two control levers, a horizontal rod interconnecting said auxiliary levers and horizontally movable by the same, a sleeve keyed to the control shaft, a projection on sleeve, a series of forks controlling sliding gears of principal change speed box, a double head at end of each fork, two notches in each head adapted to cooperate with projection on sleeve, two forked members keyed to the rod and slidably mounted on the shaft on either side of the sleeve, and means operably connecting the rod to the second change speed box.

2. A device according to claim 1, a plate at either end of said device, a series of notches in each plate for receiving said control levers, two outer notches in each plate for receiving said auxiliary levers, a socket terminating each auxiliary lever, an arm removably positionable in the socket of each auxiliary lever, and means to engage with and to disengage from, the outer notches, each of the auxiliary levers.

3. A device according to claim 1, a groove formed on each of two opposite generatrices of said control shaft, and a bearing for said control shaft, said bearing comprising a horizontal cylindrical collar slidably and revolubly receiving said shaft, two sets of balls disposed respectively along upper and lower generatrices of the collar, and resilient means urging the balls toward the interior of the collar.

4. In a device for the continuous and progressive control of a series of speeds obtained by the combination of a plurality of change speed boxes, a bearing, a change speed control shaft slidable and revoluble in the bearing, the bearing comprising, a horizontal cylindrical collar traversed by the shaft, a set of balls disposed upon the upper and lower generatrices of the collar, resilient means causing the balls to normally project into the interior of the collar, a groove formed upon each of two opposite generatrices of the shaft, the grooves cooperating with the projecting portions of the said balls when it is at the "stop" point and the shaft is to be slid in the collar.

In witness whereof I have hereunto set my hand.

PIERRE EUGÈNE MARIE DONON.